(12) United States Patent
Kychakoff et al.

(10) Patent No.: US 7,938,576 B1
(45) Date of Patent: May 10, 2011

(54) SENSING SYSTEM FOR OBTAINING IMAGES AND SURFACE TEMPERATURES

(75) Inventors: George Kychakoff, Maple Valley, WA (US); Peter Ariessohn, Summer, WA (US); Richard E. Hogle, Olympia, WA (US)

(73) Assignee: Enertechnix, Inc., Maple Valley, WA (US)

( * ) Notice: Subject to any disclaimer, the term of this patent is extended or adjusted under 35 U.S.C. 154(b) by 582 days.

(21) Appl. No.: 11/818,709

(22) Filed: Jun. 15, 2007

Related U.S. Application Data

(60) Provisional application No. 60/814,498, filed on Jun. 15, 2006.

(51) Int. Cl.
*G01J 1/16* (2006.01)
(52) U.S. Cl. ........................................................ 374/124
(58) Field of Classification Search .................. None
See application file for complete search history.

(56) References Cited

U.S. PATENT DOCUMENTS

| | | | |
|---|---|---|---|
| 4,539,588 A | 9/1985 | Ariessohn | |
| 5,010,827 A | 4/1991 | Kychakoff | |
| 5,139,412 A | 8/1992 | Kychakoff | |
| 5,219,226 A | 6/1993 | James | |
| 5,355,845 A | 10/1994 | Burgess | |
| 5,368,471 A | 11/1994 | Kychakoff | |
| 5,462,358 A | 10/1995 | Werner | |
| 5,578,995 A | 11/1996 | Bryant | |
| 5,646,338 A * | 7/1997 | Mercusot et al. | 73/86 |
| 6,560,966 B1 * | 5/2003 | Fetescu et al. | 60/775 |
| 7,437,025 B2 | 10/2008 | Kychakoff | |

\* cited by examiner

*Primary Examiner* — Andre J Allen
(74) *Attorney, Agent, or Firm* — J. Michael Neary

(57) ABSTRACT

A sensing system simultaneously obtains images and surface temperatures of processing tubes inside process heaters using an imaging sensor operating in the visible or infrared regions of the spectrum and capable of detecting visible or infrared radiation emitted or reflected from surfaces within the process heater, and of providing an image signal to a display or to an image processor. One or more single element infrared detectors viewing specific regions within the aforesaid image accurately measure the intensity of radiation emitted by surfaces within those specific regions so as to allow the temperature of the surfaces within those specific regions to be inferred.

26 Claims, 2 Drawing Sheets

SENSING SYSTEM FOR OBTAINING IMAGES AND SURFACE TEMPERATURES

This invention relates to U.S. Provisional Application Ser. No. 60/814,498 filed Jun. 15, 2006, entitled "Sensing system for Obtaining Images and Surface Temperatures." This invention pertains to sensing systems for simultaneously obtaining images and temperatures of surfaces inside process heaters, and particularly for obtaining images and surface temperatures of processing tubes inside process heaters.

BACKGROUND OF THE INVENTION

Imaging and temperature sensing systems for inspecting equipment condition and operation in the interior of high temperature process equipment has long been needed to monitor for when cleaning or other maintenance is required, or to detect when incipient failures are expected so corrective steps can be taken to correct the problem before it becomes an actual failure. Such equipment is needed for use in the interior of a great variety of high temperature process equipment such as furnaces, boilers, gasifiers, process heaters, ducts, hot gas filtration systems, electrostatic precipitators, and ash hoppers, and also of equipment that operates at intermediate temperatures in the region above 500° F.

One illustrative example of equipment in which such imaging and temperature sensing systems would be very useful is in catalytic hydrogen reformers. Catalytic hydrogen reformers are often used in petroleum refineries as source of hydrogen for use in hydrotreating to remove sulfur from heavy fractions and high sulfur crude. In the hydrogen reformer, a stream of light refinery off-gas plus natural gas and steam is passed through catalyst filled tubes inside a furnace to carry out a reaction that converts the methane and refinery off-gases into hydrogen and carbon dioxide. The catalyst (most commonly nickel) enables the reaction to proceed nearly to completion at very high temperatures—typically around 850° C. The high temperature requires the use of tubes composed of exotic, very expensive alloys. However, even these alloys can be damaged by exposure to excessively high temperature, so it is imperative to maintain the tubes within a safe temperature range. When operated properly, a hydrogen reformer furnace can operate for several years before tubes need to be replaced and catalyst regenerated. Overheating can lead to forced outages and can require premature tube replacement, which is extremely costly—both in labor and equipment costs as well as in lost production.

At the present time there is no commercial technology available that can continuously monitor tube temperature profiles within an operating hydrogen reformer furnace. Infrared pyrometers are capable of measuring tube temperatures, but provide only a point measurement. Therefore, to develop a complete map of tube temperature distributions, it is necessary to make point measurements at a very large number of locations and assemble those measurements into a map—a very cumbersome and time-consuming process. Also, infrared pyrometer measurements can produce inaccurate results due to two effects. One is that the emissivity of the tube surface must be estimated in order to allow temperature to be inferred from a measurement of radiant intensity. Often the emissivity is not known since it can change over time as scale forms on the outside of the tubes. Also, tube emissivity depends to some extent on the tube temperature, creating a "catch-22" situation where the tube temperature must be known in order to estimate the emissivity, but the emissivity must be known in order to convert measured radiant intensity into temperature. A second issue that must be taken into consideration is that not all of the radiation emanating from the tube surface results from thermal emission—some is reflected or scattered light that originates at other locations within the furnace. Most hydrogen reformers are lined with refractory whose surfaces are much hotter than the reformer tubes, so—although the emissivity of the refractory may be lower than that of the tubes—the thermal radiation emitted by the refractory walls can be quite significant and must be accounted for in order to achieve acceptable levels of accuracy in determining the actual tube temperature from a passive measurement of the radiation emanating from the tube surface.

A video imaging system provides a means of collecting such radiant intensity information about a very large number of locations throughout the furnace interior simultaneously and continuously. Furthermore, a silicon CCD camera has sufficient linearity and reproducibility to permit quantitative comparisons of intensity on a pixel by pixel basis. One challenge in using a visible light sensitive imaging system to measure temperature, however, is that the amount of thermally emitted radiation in the visible spectrum is relatively small compared to that emitted in the infrared (except at very high temperatures), and the change in intensity for a given change in temperature is also much smaller than in the infrared. Nevertheless, modern silicon CCD cameras have very high sensitivity and very large dynamic range, so it is possible to relate image intensity to temperature in situations where the scene temperatures are above, say, 500° C. Therefore, a camera system which images the interior of a hydrogen reformer and provides a map of intensity variation over the viewed area, when combined with a separate measurement of temperature at one or a few specific points within the scene, would allow the temperature of every point within the scene to be determined.

A system that would provide operators with a continuous measurement of tube temperature distributions and display the results in the form of an image (possibly color coded to represent temperature), would be of immense value to the petroleum refining industry.

SUMMARY OF THE INVENTION

The invention provides a sensing system for simultaneously obtaining images and surface temperatures of processing tubes inside process heaters includes an imaging sensor operating in the visible or infrared regions of the spectrum. The imaging sensor is capable of detecting visible or infrared radiation emitted or reflected from surfaces within the process heater and providing an image signal to a display or to an image processor. One or more single element infrared detectors viewing specific regions within the aforesaid image accurately measure the intensity of radiation emitted by surfaces within those specific regions so as to allow the temperature of the surfaces within those specific regions to be inferred.

DESCRIPTION OF THE DRAWINGS

The invention and its many attendant features and advantages will become clear upon reading the following detailed description of the preferred embodiment, in conjunction with the following drawings, wherein.

DESCRIPTION OF THE PREFERRED EMBODIMENTS

Figure 1:
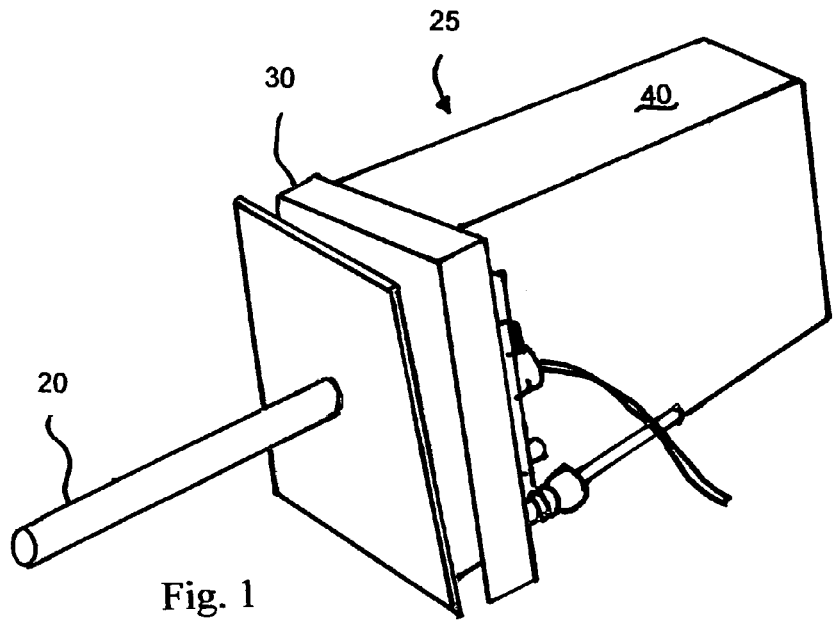
FIG. 1 is a perspective view of the sensing system in accordance with this invention.
Figure 2:
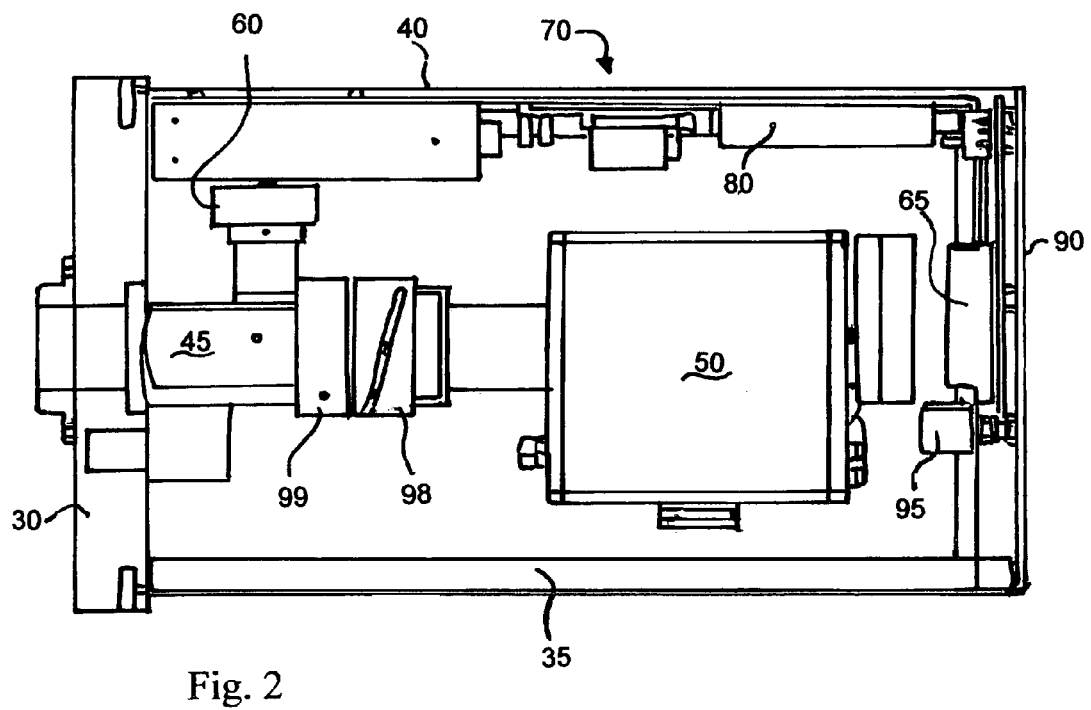
FIG. 2 is a sectional elevation of the interior of the system shown in FIG. 1, showing electrical and optical components of the sensing system inside the enclosure.
Figure 3:
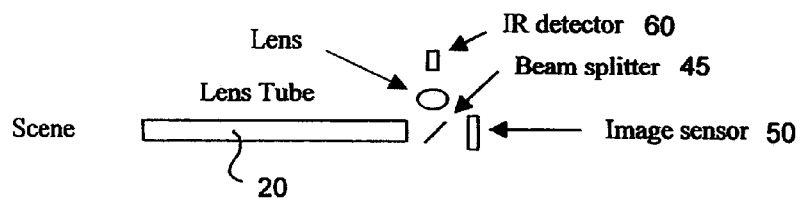
FIG. 3 is a schematic drawing showing in greatly simplified form the primary elements of the system.
Figure 4:
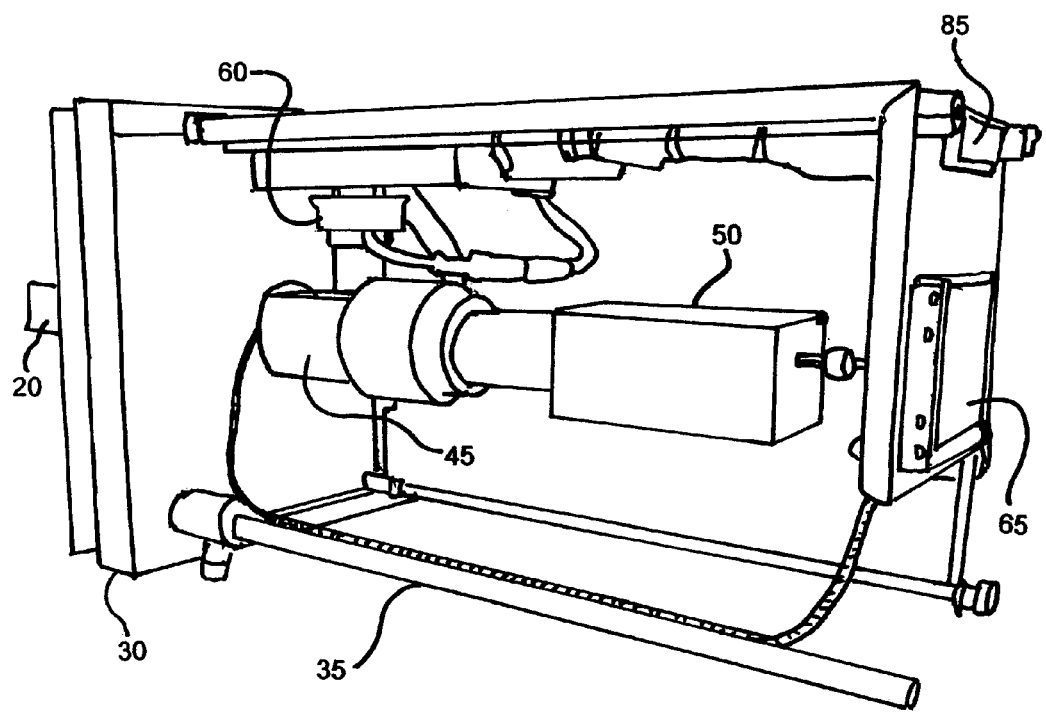
FIG. 4 is a perspective side view showing the system with the cover removed.

Turning to the drawings, wherein like reference characters designate identical or corresponding parts, and more particularly to FIGS. 1 and 2 thereof, a sensing system is shown having a lens tube 20 connected to and supported by an enclosure 25. The enclosure includes a front plate 30 to which four support tubes 35 are rigidly fastened. The support tubes 35 support electronic and optical elements of the system, and a cover 40 that covers and protects those components.

As shown in FIG. 2, the sensing system is shown having a partially reflective, beam splitter 45 placed in an optical train ahead of an image sensor. The image sensor can be a CCD visible spectrum camera such as a PyroMetrix WV-GL924A made by Panasonic. Light is collected and focused into an image by optical elements (not shown) in a lens tube 55 supported by the front plate 30. The beam splitter 45 reflects a portion of the light within the image and directs that light onto an active area of a single element infrared detector 60. Alternatively, a partially reflective beam splitter placed in the optical train ahead of the single element infrared detector, reflects a portion of the light onto the active area of image sensor. These two alternative embodiments are pretty much the same except for the location of the image sensor and IR detector. In the first embodiment shown in FIG. 2, the beam splitter would reflect a small fraction of the light, or else it would reflect the IR and transmit the visible. In the second embodiment, the beam splitter would reflect most of the light or else it would reflect the visible and transmit the IR.

The light passing through the beam splitter is focused on a CCD detector in the camera 50 and an image is displayed on a monitor screen 65 at the rear of the enclosure. The light diverted into the infrared detector 60 is used in a through-the-lens pyrometer circuit 70 powered by a power supply 75 and amplifier, and a linearizer 80 to create a temperature measurement of the portion of the field of view sampled by the infrared detector. This temperature measurement is displayed on a display meter 85 visible through a window 90 at the rear end of the cover 40. An emissivity adjustment control 95 with a manual adjustment knob is located at the rear of the enclosure for adjusting the display based on the emissivity of the hot surfaces in the field of view. Aperture and focus adjustments 98 and 99 are in the optical train for adjusting the image during set-up or when the system is moved.

In the sensing system described above, a lens could be placed ahead of the single element infrared detector to project an image onto the plane containing that detector.

The beam splitter shown in FIG. 1 is a dichroic beam splitter which reflects the infrared portion of the spectrum and transmits the visible portion of the spectrum. Alternatively, the beam splitter could be a dichroic beam splitter which reflects the visible portion of the spectrum and transmits the infrared portion of the spectrum.

The light projected onto the single element infrared detector corresponds to a specific region within the image detected by the image sensor.

The relative intensity of each point within the detected image produced by the imaging sensor is calibrated by comparing the intensity at that point to the average image intensity in the specific region measured by one of the single element infrared detectors and applying the Planck Black Body relationship to infer the temperature at the point in question based on the temperature inferred from the signal produced by the single element detector. Also, the relative intensity of any given region of arbitrary shape within the detected image produced by the imaging sensor is calibrated by comparing the average intensity within that region to the image intensity in the specific region measured by one of the single element infrared detectors and applying the Planck Black Body relationship and the temperature measured by the single element infrared detector to infer the average temperature within the arbitrarily shaped region in question.

The relationship between the inferred temperature in a specific region within the image and the intensity measured by a single element infrared detector viewing that specific region is determined from laboratory calibration using a calibrated black body source.

Average temperatures within multiple arbitrarily shaped regions are inferred from a comparison of the image intensity within each of those regions against the average intensity of the image within the specific region viewed by the infrared detector and the temperature inferred from the intensity measured by the infrared detector within that specific region.

The light sensed by the image sensor consists of one portion of the spectrum and the light sensed by the calibrated single element infrared sensors consists of a different portion of the spectrum. A system of lenses can be employed that are capable of transmitting light within the spectral region to which the image sensor is sensitive as well as the spectral region to which the calibrated infrared sensors are sensitive. One optical filter is used to limit the wavelengths of light reaching the image sensor and a second optical filter is used to limit the wavelengths of light reaching the single element infrared sensors.

Alternatively, the light sensed by the image sensor consists of one portion of the spectrum and multiple single element infrared sensors are employed, each sensing a different portion of the spectrum.

In another embodiment, a second dichroic beamsplitter is placed in the beam reflected by the first beamsplitter in order to separate that light into two portions, each containing a specific range of wavelengths, and in which the light within each such spectral portion is directed to one of two single element infrared detectors each of which produces a signal proportional to the intensity of radiation within the spectral band which impinges upon it. In this embodiment, the temperature within the specific region viewed by the two single element infrared detectors can be determined by taking the ratio of the intensities measured by these two detectors and relating that ratio to a calibration curve calculated from the Planck Black Body relationship for the two particular spectral regions sensed by the two detectors.

Arbitrarily shaped regions can be outlined by the operator and the average temperature can be calculated at arbitrary locations within the image, which displays outlines of those regions and the temperatures within those regions superimposed on the displayed image.

Regions of excessively high or low temperatures can be identified automatically, and the region containing those excessive temperatures can be highlighted with a visual indicator superimposed on the displayed image. This may be accomplished by thresholding or by subtracting a reference image from the current image to determine regions whose intensity is substantially different from that of the reference image. The user may define temperature alarm limits and the system will automatically generate an alarm if the intensity within any region of the image exceeds that corresponding to upper temperature alarm value or falls below the lower temperature alarm limit.

Also, regions in which the temperature changes at a rate greater than a user specified amount can be automatically detected. This can be accomplished by maintaining an archive of images or by maintaining an archive of temperature data over time. This provides information which, among other uses, allows the thermal stress imposed on heater tubes and other equipment and fixtures within the process heater resulting from rapid variations in temperature to be calculated.

The system can be used as an object recognition system utilizing images produced by an the imaging system to identifies objects within the image despite motion and vibration of those objects which causes them to appear at different locations or appear to change shape from one frame to the next. Object recognition can be accomplished by use of a variety of image processing techniques such as thresholding and grouping of regions based on intensity, use of dilation/erosion algorithms, use of pattern recognition algorithms, or by use of matched filter techniques. The temperature of specific objects within the process under inspection can be associated with those objects and displayed in the display.

The emissivity of different surfaces within the process vessel can be determined with the system disclosed above. Two methods are contemplated for accomplishing this function. In one, a laser beam is reflected from the surface in question and the reflected intensity is measured. If there is negligible absorption of the radiation by the process gases, the emissivity can be determined since absorptivity is one minus reflectivity and the emissivity is equal to the absorptivity. This is especially effective using a model of the scattering properties of the surface. The second method is to use a two color pyrometer to determine the surface temperature and then use one of the two measurements to infer emissivity.

The relationship between temperature and image intensity can be continuously or periodically updated by comparing the image intensity at a point in the image corresponding to the location of a temperature sensor (such as a thermocouple) attached to a surface within the process vessel to the temperature measured by that sensor.

The surface temperature of process heater tubes inside a furnace can be measured employing a thermographic phosphor painted onto the tube surface. Ultraviolet light from a pulsed UV light source is projected onto the phosphor and the fluorescent emission is collected by a lens or mirror assembly and focused onto a detector sensitive to the wavelength of the emitted fluorescence. A narrow band interference filter or a diffractive element is used to select only the spectral region of the fluorescent emission and reject all other light so that the detector is exposed only to light within the spectral region of the fluorescent emission. The decay time constant of the fluorescence is measured and the temperature of the surface is determined from a calibration curve relating decay time constant to the temperature of the thermographic phosphor. This calibration curve can be generated in a laboratory by placing a sample of the phosphor in a temperature controlled oven and measuring the decay time constant as a function of temperature. The lens assembly used to project an image of the interior of the process vessel onto the image detector also collects the fluorescent emission from the thermographic phosphor. A wavelength selective beam splitter which reflects only the wavelength band containing the fluorescent emission directs the fluorescent light to a sensitive detector with rapid time response such as a photomultiplier tube or an avalanche photodiode. Alternatively, the beamsplitter may not be wavelength selective, but will reflect a portion of the light over a wide range of wavelengths. In that case, a narrow-band filter will be placed in front of the fluorescence detector to limit the spectral range of the light reaching the detector. In either case, the temperature of the thermographic phosphor will be determined by measuring the decay time constant of the fluorescence. The temperature of any particular location within the scene can be determined by comparing the relative intensity within the image at that location to the intensity of the image immediately adjacent to the location of the thermographic phosphor spot within the image.

To account for the fraction of the total radiation emanating from that particular location which is reflected radiation originally emitted from other radiating surfaces within the furnace, a method for compensating the image intensity at a point within the image which corresponds to a particular location within the furnace includes estimating the temperature of the other surfaces and developing a model of the geometry of the furnace which allows the contribution of the reflected radiation to be estimated. To estimate the temperature of the other surfaces, the intensity of the radiation emitted from those surfaces measured. If the other surfaces (such as the refractory lining of the furnace) are much hotter than the surface of interest (the tubes), then the intensity of the radiation emanating from those other surfaces will consist almost entirely of the thermal emission due to their temperature and will not contain a large contribution due to reflection of radiation emitted by other surfaces. Also, the measured intensity when pointing the measuring device at these other surfaces will be a measure of their effective black body temperature which accounts for their emissivity as well as their actual temperature.

The thermographic phosphor approach described above is a way to determine the actual temperatures of each of the surfaces within the furnace. If the actual temperature of a surface is known, and the brightness temperature is measured (the apparent temperature based on a measurement of the radiation emitted from the surface), the hottest surfaces can be measured and then measurements of successively cooler and cooler surfaces—accounting for the reflections from all the hotter surfaces at each step—an estimate of the emissivity of each of the surfaces can be derived. Then, with the aid of a fairly simple model, a much more accurate estimate of the actual tube emissivity can be developed. Then, the temperature at the location of the thermographic phosphor can be used to scale the image intensity at other locations to get temperatures at those locations.

Alternatively, all of the tubes could be painted with the thermographic phosphor and measure the temperature directly at a large number of points to develop a complete temperature map. This would be more cumbersome and expensive to implement than the previous approach.

A method to compensate for flame radiation reflected from tube surfaces, in order to correct the measured intensity within the image to derive an intensity that more accurately represents only the radiation emitted by the tube due to its temperature, includes measuring the brightness of the flame to provide an estimate of the intensity of radiation impinging on the tube surface. There will probably be very little light reflected from the flame, so the measured brightness will be almost completely dominated by flame radiation. From the measurement of the flame brightness, it is possible to compensate for the flame radiation reflected from the tubes given a crude estimate of the tube emissivity. For natural gas flames this is not an issue since the flame emits very little light in the visible portion of the spectrum. For oil or pulverized coal flames this can be a significant issue.

To account for the fraction of the total radiation emanating from a particular location that is reflected radiation originally emitted from other radiating surfaces within the furnace, a method is provided for compensating the image intensity at a point within the image which corresponds to a particular location within the furnace. One way to do this is to estimate the temperature of the other surfaces and develop a model of the geometry of the furnace which allows the contribution of the reflected radiation to be estimated. One way to estimate the temperature of the other surfaces is to measure the intensity of the radiation emitted from those surfaces. If the other surfaces (such as the refractory lining of the furnace) are much hotter than the surface of interest (the tubes), then the intensity of the radiation emanating from those other surfaces will consist almost entirely of the thermal emission due to their temperature and will not contain a large contribution due to reflection of radiation emitted by other surfaces. Also, the measured intensity when pointing the measuring device at these other surfaces will be a measure of their effective black body temperature which accounts for their emissivity as well as their actual temperature.

The same thing can be accomplished by an algorithm. However, the thermographic phosphor approach described above is a way to determine the actual temperatures of each of the surfaces within the furnace. Knowing the actual temperature of a surface, and measuring the brightness temperature (the apparent temperature based on a measurement of the radiation emitted from the surface), the hottest surfaces are measured first and then measurements of successively cooler and cooler surfaces are made, accounting for the reflections from all the hotter surfaces at each step, it is possible to derive an estimate of the emissivity of each of the surfaces. Then, with the aid of a fairly simple model, a much more accurate estimate of the actual tube emissivity can be developed, and then the temperature at the location of the thermographic phosphor is used to scale the image intensity at other locations to get temperatures at those locations.

Alternatively, we could just paint all of the tubes with the thermographic phosphor and measure the temperature directly at a large number of points to develop a complete temperature map. This would be cumbersome and expensive to implement.

To correct the measured intensity within the image to derive an intensity that more accurately represents only the radiation emitted by the tube due to its temperature, a method is provided to compensate for flame radiation reflected from tube surfaces. For natural gas flames this is not an issue since the flame emits very little light in the visible portion of the spectrum. For oil or pulverized coal flames this can be a significant issue. A measurement of the brightness of the flame can provide an estimate of the intensity of radiation impinging on the tube surface. There is very little light reflected from the flame, so the measured brightness will be almost completely dominated by flame radiation. From this it is possible to compensate for the flame radiation reflected from the tubes given a crude estimate of the tube emissivity.

In the case where an independent measure of tube temperature at one or several specific points is available—say from permanently mounted thermocouples—a measurement of the radiant intensity emanating from one such location would allow the emissivity of the tube to be accurately determined if there were no other radiating surfaces within the furnace and reflected radiation were not a factor. If, on the other hand, an independent measurement of the temperatures of the other surfaces—even at only a few isolated points—were available, it would be possible to construct a complete model of the radiation environment within the furnace and set up a system of equations that could be used to solve for the actual tube temperature at any location based on the radiant intensity (including both thermally emitted and reflected radiation) at that location.

Obviously, numerous modifications and variations of the preferred embodiment described above are possible and will become apparent to those skilled in the art in light of this specification. For example, many functions and advantages are described for the preferred embodiment, but in some uses of the invention, not all of these functions and advantages would be needed. Therefore, we contemplate the use of the invention using fewer than the complete set of noted functions and advantages. Moreover, several species and embodiments of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species. Accordingly, we expressly intend that all these embodiments, species, modifications and variations, and the equivalents thereof, are to be considered within the spirit and scope of the invention as defined in the following claims, wherein we claim:

The invention claimed is:

1. A sensing system for simultaneously obtaining images and surface temperatures of processing tubes inside process heaters, comprising:
    an imaging sensor operating in the visible or infrared regions of radiation capable of detecting visible or infrared radiation emitted or reflected from surfaces within the process heater and providing an image signal to a display means or to an image processing means; and
    one or more single element infrared detectors viewing specific regions within the aforesaid image for accurately measuring the intensity of radiation emitted by surfaces within those specific regions so as to allow the temperature of the surfaces within those specific regions to be inferred.

2. A sensing system as in claim 1 in which a partially reflective, beam splitter placed in the optical train ahead of the image sensor reflects a portion of the light within the image and directs that tight onto the active area of a single element infrared detector.

3. A sensing system as in claim 1 in which a partially reflective, beam splitter placed in the optical train ahead of the single element infrared detector reflects a portion of the light onto the active area of image sensor.

4. A sensing system as in claim 1 in which a lens placed ahead of the single element infrared detector projects an image onto the plane containing that detector.

5. A sensing system as in claim 2 in which the beam splitter is a dichroic beam splitter which reflects the infrared portion of said radiation and transmits the visible portion of the spectrum.

6. A sensing system as in claim 3 in which the beam splitter is a dichroic beam splitter which reflects the visible portion of said radiation and transmits the infrared portion of the spectrum.

7. A sensing system as in claim 2 in which the light projected onto the single element infrared detector corresponds to a specific region within the image detected by the image sensor.

8. A sensing system as in claim 1 in which the relative intensity of each point within the detected image produced by the imaging sensor is calibrated by comparing the intensity at that point to the average image intensity in the specific region measured by one of the single element infrared detectors and applying the Planck Black Body relationship to infer the temperature at the point in question based on the temperature inferred from the signal produced by the single element detector.

9. A sensing system as in claim 1 in which the relative intensity of a given region of arbitrary shape within the detected image produced by the imaging sensor is calibrated by comparing the average intensity within that region to the image intensity in the specific region measured by one of the single element infrared detectors and applying the Planck Black Body relationship and the temperature measured by the single element infrared detector to infer the average temperature within the arbitrarily shaped region in question.

10. A sensing system as in claim 1 in which the relationship between the inferred temperature in a specific region within the image and the intensity measured by a single element infrared detector viewing that specific region is determined from laboratory calibration using a calibrated black body source.

11. A sensing system as in claim 9 in which average temperatures within multiple arbitrarily shaped regions are inferred from a comparison of the image intensity within each of those regions against the average intensity of the image within the specific region viewed by the infrared detector and the temperature inferred from the intensity measured by the infrared detector within that specific region.

12. A sensing system as in claim 1 in which the light sensed by the image sensor consists of one portion of said radiation and the light sensed by the calibrated single element infrared sensors consists of a different portion of the spectrum.

13. A sensing system as in claim 12 employing a system of lenses capable of transmitting light within the spectral region to which the image sensor is sensitive as well as the spectral region to which the calibrated infrared sensors are sensitive.

14. A sensing system as in claim 13 in which one optical fitter is used to limit the wavelengths of light reaching the image sensor and a second optical filter is used to limit the wavelengths of light reaching the single element infrared sensors.

15. A sensing system as in claim 1 in which the light sensed by the image sensor consists of one portion of said radiation and in which multiple single element infrared sensors are employed, each sensing a different portion of said radiation.

16. A sensing system as in claim 2 in which a second dichroic beam splitter is placed in the beam reflected by the first beam splitter in order to separate that light into two portions, each containing a specific range of wavelengths, and in which the light within each such spectral portion is directed to one of two single element infrared detectors each of which produces a signal proportional to the intensity of radiation within the spectral band which impinges upon it.

17. A sensing system as in claim 16 in which the temperature within the specific region viewed by the two single element infrared detectors is determined by taking the ratio of the intensities measured by these two detectors and relating that ratio to a calibration curve calculated from the Planck Black Body relationship for the two particular spectral regions sensed by the two detectors.

18. An image processing system employing a sensing system as in claim 9 which allows the operator to place the arbitrarily shaped regions in which the average temperature is calculated at arbitrary locations within the image and which displays outlines of those regions and the temperatures within those regions superimposed on the displayed image.

19. An image processing system employing a sensing system as in claim 8 which automatically identifies regions of excessively high or low temperatures and highlights the region containing those excessive temperatures with a visual indicator superimposed on the displayed image. This may be accomplished by thresholding or by subtracting a reference image from the current image to determine regions whose intensity is substantially different from that of the reference image.

20. An image processing system as in claim 19 in which the user may define temperature alarm limits and the system will automatically generate an alarm if the intensity within any region of the image exceeds that corresponding to upper temperature alarm value or falls below the lower temperature alarm limit.

21. An image processing system employing a sensing system as in claim 8 which automatically detects regions in which the temperature changes at a rate greater than a user specified amount. This can be accomplished by maintaining an archive of images or by maintaining an archive of temperature data over time.

22. A process analysis system using information provided by an image processing system as in claim 21 which calculates the thermal stress imposed on heater tubes and other equipment and fixtures within the process heater resulting from rapid variations in temperature.

23. A process analysis system using information provided by an image processing system as in claim 21 which tracks temperature profile histories of tube banks, individual tubes, equipment or fixtures within the process heater.

24. A process analysis system using information provided by an image processing system as in claim 21 which estimate remaining useful life of tubes, equipment and fixtures based on their temperature profile histories.

25. An object recognition system utilizing images produced by an imaging system as in claim 1 which identifies objects within the image despite motion and vibration of those objects which causes them to appear at different locations or appear to change shape from one frame to the next; wherein object recognition is accomplished by use of a variety of image processing techniques such as thresholding and grouping of regions based on intensity, use of dilation/erosion algorithms, use of pattern recognition algorithms, or by use of matched filter techniques.

26. A process analysis system that employs an imaging system as in claim 1, for associating temperature with specific objects within the process under inspection, comprising:
    means for automatically detecting regions in which the temperature changes at a rate greater than a user specified amount by maintaining an archive of images or by maintaining an archive of temperature data over time;
    means for calibrating the relative intensity of each point within the detected image produced by the imaging sensor by comparing the intensity at that point to the average image intensity in the specific region measured by one of the single element infrared detectors and applying the Planck Black Body relationship to infer the temperature at the point in question based on the temperature inferred from the signal produced by the single element detector; and
    along with an object recognition system as in claim 23 to associate temperature with specific objects within the process under inspection; and
    means for tracking temperature profile histories of tube banks, individual tubes, equipment or fixtures within the process heater.

* * * * *